(12) United States Patent
Noble et al.

(10) Patent No.: US 6,580,195 B1
(45) Date of Patent: Jun. 17, 2003

(54) DISK MOTOR

(75) Inventors: Ernest John Noble, Auckland (NZ); David James Howell, Auckland (NZ); Tomer Eliahu, Auckland (NZ)

(73) Assignee: Wellington Drive Technologies Limited, Auckland (NL)

( * ) Notice: Subject to any disclaimer, the term of this patent is extended or adjusted under 35 U.S.C. 154(b) by 0 days.

(21) Appl. No.: 09/937,010

(22) PCT Filed: Mar. 23, 2000

(86) PCT No.: PCT/NZ00/00035
§ 371 (c)(1),
(2), (4) Date: Sep. 19, 2001

(87) PCT Pub. No.: WO00/57538
PCT Pub. Date: Sep. 28, 2000

(30) Foreign Application Priority Data

Mar. 23, 1999 (NZ) .................................................. 334768

(51) Int. Cl.[7] .............................. H20K 7/06; H20K 1/00; H02K 1/22
(52) U.S. Cl. .......................... 310/268; 310/81; 310/237; 310/198
(58) Field of Search ............................ 310/268, 156.32, 310/156.33, 156.34, 156.35, 156.36, 156.37

(56) References Cited

U.S. PATENT DOCUMENTS

| 4,283,644 A | * | 8/1981 | Kondo | 310/68 |
| 4,508,998 A | * | 4/1985 | Hahn | 310/138 |
| 5,656,880 A | | 8/1997 | Clark | 310/268 |
| 6,169,348 B1 | * | 1/2001 | Won | 310/81 |

FOREIGN PATENT DOCUMENTS

JP 59056835 A * 4/1984

* cited by examiner

*Primary Examiner*—Thomas M. Dougherty
*Assistant Examiner*—Iraj A Mohandesi
(74) *Attorney, Agent, or Firm*—Drinker Biddle & Reath LLP

(57) ABSTRACT

A discoidal brushless DC motor having a stator (507) carrying windings (503) arranged in slots which radiate out from the center of the stator to the periphery. The depth of each slot increases towards the center of the stator. The slot, therefore, is wider (from side to side) and shallower towards the periphery of the stator, and narrower (from side to side) and deeper towards the center of the stator. This arrangement ensures that the windings are contained below the surface (504) of the stator (507). The magnetic circuit includes a backing of a ferromagnetic material (509). This ferromagnetic material (509) can be a watch spring core made from a long strip of soft iron tape.

10 Claims, 4 Drawing Sheets

DISK MOTOR

TECHNICAL FIELD OF THE INVENTION

This invention relates to rotary dynamoelectric machines of the brushless direct current motor type having a disk configuration, and in particular relates to improvements in stators for that kind of machine.

BACKGROUND

For a brushless DC disk motor, which generally comprises sets of adjacent magnetisable disks bearing a plurality of interacting magnetic poles and one disk is caused to rotate about an axis as a result of torques produced by interaction between fixed magnetic poles in usually the movable surface or rotor, and windings for generating controllable magnetic poles within usually the fixed surface or stator (so that no wiping commutator is required), there is generally a need to construct motors that are as efficient as possible. (Of course the same argument could be used for a dynamo in which case the device is instead a transducer to convert motive power into electrical energy, and this document includes dynamos within its scope).

Stator design involves consideration of the magnetic circuit and where ferromagnetic elements of high magnetic permeability (including, of course, the permanent magnets) are involved it is useful to minimise the portions of any magnetic circuit that have a low permeability. As a result a given current within any winding results in a greater torque (or vice versa for a dynamo). The present application explores ways to improve the design of wound stators which are primarily applicable to cases where windings associated with a disk form include a large radially directed amount of conductor, such as in a disk motor.

OBJECT

It is an object of this invention to provide an improved rotary dynamoelectric machine, or at least to provide the public with a useful choice.

STATEMENT OF INVENTION

In one aspect the invention provides a stator winding for a discoidal rotary dynamoelectric machine, having a plurality of generally radially disposed groups of conductors; wherein the space occupied by the conductors of any one group is wider (from side to side) and shallower towards the periphery of the stator and narrower (from side to side) and deeper towards the center of the stator.

In another aspect the invention provides a discoidal rotary dynamoelectric machine, having at least a rotor disk and a stator disk supporting a stator winding as described in the previous paragraph Preferably each group of conductors on the stator lies over a ferromagnetic malarial having a magnetic permeability greater than that of air.

Preferably the cross-sectional area of each group of conductors is substantially constant at any plane tangential to the axes of rotation and including the radially disposed groups of conductors.

Preferably the ferromagnetic material slopes away from the rotor from the periphery of the stator towards the center of the stator, so that the ferromagnetic material is maintained adjacent to the windings.

Preferably the ferromagnetic material is chosen from the group comprising: iron wire, iron strip, iron powder, and bulk iron.

Preferably the stator is a shaped disk and has a plurality of generally radially disposed depressions capable of receiving a plurality of tins of the conductors, wherein each depression is wider towards the periphery of the disk.

Preferably each depression is also deeper towards the center of the shaped disk.

Preferably the rotor has between two and 128 permanent magnetic poles, and in its most preferred form has 8 poles.

In another aspect the invention provides a method of creating a stator winding for a discoidal rotary dynamoelectric machine, by winding a plurality of generally radially disposed groups of elongate conductors on a shaped former having a center and a periphery, the shaped former has a plurality of generally radially disposed depressions capable of receiving a plurality of turns of the conductors, wherein each depression is wider towards the periphery and conductors are wound in such a way that the space occupied by the conductors of any one group is wider (from side to side) and shallower towards the periphery of the stator and narrower (from side to side) and deeper towards the center of the former.

In a further aspect this invention provides a rotary dynamoelectric machine, having at least a first and a second adjacent magnetisable surface each in the form of a disk and each bearing a plurality of magnetic poles, where one surface may be caused to rotate, about an axis, across the other surface as a result of interaction between fixed magnetic poles included in the first surface and controllable magnetic poles included in the second surface, wherein the magnetic poles of at least one second surface result from electric currents flowing within a plurality of groups of wound conductors or windings, each group being wound within a depression formed within a shaped disk, each depression being expanded laterally towards the periphery.

Preferably each depression lies over a ferromagnetic material (having a magnetic permeability greater than that of air), forming part of a magnetic circuit including the adjacent first surface.

It is also preferred that each depression is also deeper towards the center of the shaped disk.

Preferably each depression is deeper towards the center of the shaped disk, so that the cross-sectional area in a tangential plane to the axis of rotation of the second surface and including a winding area is substantially similar.

Preferably the maximum number of turns of conductor that can be wound so as to lie beneath the outer boundaries of the depression is substantially constant at any plane tangential to the axis of rotation and including a winding are&

Preferably the ferromagnetic material is also positioned deeper towards the center of the shaped disk, so that the ferromagnetic material is maintained adjacent to the windings.

Ferromagnetic materials can include: iron wire or iron strip wound in the form of a watch-spring coil, possibly a ferrite, iron powder, or for dynamoelectric machines intended for use at relatively low speeds, bulk iron.

A preferred ferromagnetic material is a magnetically soft iron wire wound in the form of a coil Another preferred ferromagnetic material is a magnetically soft iron strip wound in the form of a watch-spring coil.

Yet another preferred ferromagnetic material is iron powder, either pressed into the required shape or supported by epoxy/plastic binders.

An alternative ferromagnetic material, more particularly for dynamoelectric machines intended for use at relatively low speeds, is bulk iron or more preferably an alloy including iron and having a relatively low hysteresis.

A preferred number of poles is between two and 128.

More preferably the number of poles is eight.

In another aspect the invention provides an electric disk motor, having a magnetisable assembly facing an array of generally radially oriented windings; one being rotatable in relation to the other, one having magnetic poles, the other having windings, the windings being held within cavities in a support structure, wherein each cavity is wider and shallower towards the external periphery of the motor and narrower and deeper towards the center of the motor.

In another aspect the invention provides a brushless DC disk motor, having a rotatable permanent magnet assembly and an array of generally radially oriented windings in more than one sector each held within a corresponding slot in a shaped winding former, wherein each slot provides a winding space, and wherein the space occupied by the winding of any one sector is wider and shallower towards the periphery and narrower (from side to side) and deeper towards the center of the moulded winding former.

The invention also encompasses a stator or a shaped winding former for such dynamoelectric machines (particularly for brushless DC disk motors).

In a further broad aspect the dynamoelectric machine may be operated in a dynamo mode of operation, in which causing relative rotatory motion of the first and second disks has the effect of inducing the flow of electric currents within the plurality of groups of wound conductors.

The dynamoelectric machine can have at least one stationary disk including windings and hence no wiping contacts capable of carrying current between a fixed conductor and a rotating conductor.

Alternatively the at least one stationary disk includes permanent magnets, and wiping contacts capable of carrying current between a fixed conductor and a rotating conductor are provided in order to energise windings on at least one rotatable disk.

PREFERRED EMBODIMENTS

The description of the invention to be provided herein is given purely by way of example and, together with the various examples to be described and illustrated, is not in any way to be taken as limiting the scope or extent of the invention. It should also be recognised that some of the drawings include dimensions in millimetres to aid in the understanding of the shape of the stator, but such dimensions are given purely by way of example and are not intended to be limiting in any way.

DRAWINGS

FIG. 1: shows in principle how the profile of an individual depression (or group of conductors) changes from the periphery to the center, in order to contain a fixed number of sectioned circular conductors within a narrower space.

FIG. 2: shows a perspective view of part of a stator core, including three sections through a group of conductors taken from FIG. 1.

The principles of this invention are shown in the illustrations. As is well known, dimensions across a sector of a circle diminish closer to the center. In a disk motor, windings are laid down in more or less radial active portions and each winding would ideally occupy a sector of the disk. Thus a scheme to pack the same number of conductors into a diminishing sector width exists. Note the labelling of certain conductors "A.D" in section 103, and the corresponding example positions of those conductors in the other sections.

In prior art discoidal dynamoelectric machines the stator is generally based on a "coil former" having a number of radiating slots of more or less constant width and any section across a winding will tend to show a similar breadth and height of piled conductors. There is empty space between the other ends of one winding and an adjacent winding, and the proportion of empty space to winding depends on the ratio of the inner to the outer radius of the stator. To not have that empty space (which represents an identifiable inefficiency) would tend to lead to conductors spilling out of the slot towards the inner margin of the stator and these would tend to collide with the nearby rotatable magnet array. This is the problem to be solved FIGS. 1 to 5 of the following drawings show a stator having specially shaped depressions to allow the generally radially disposed groups of conductors making up the windings to be wound in such a way that they take up a wider but shallower space near the periphery of the stator than they do towards the center of the stator. Thus the conductors can be wound onto the shaped stator. In an alternative example, the conductors can be wound onto a shaped former, then held in the required shape by a resin or the like, and subsequently attached to a stator disk FIG. 6 shows such a stator winding prior to attachment to a stator.

Figure 1:
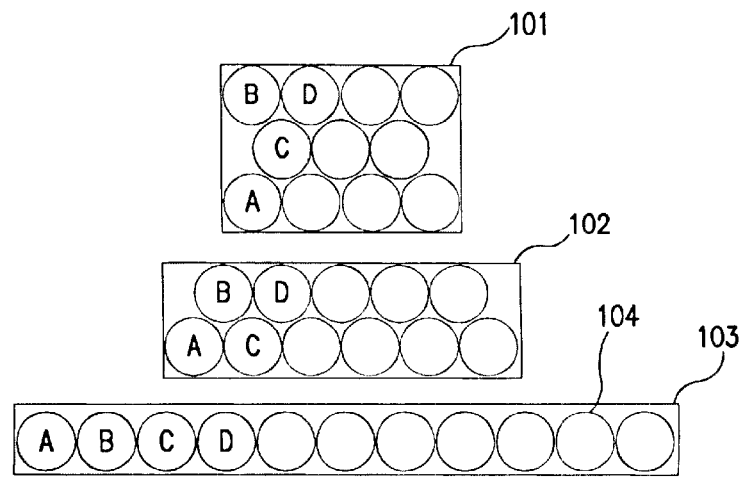

FIG. 1 shows three ways to pack 11 spherical outlines (representing conductors 104) into rectangles which tend to have similar cross-sectional areas although a more relevant requirement is that the requisite number of outlines are at least contained within a cross-sectional outline. The rectangle 101 holds 11 outlines in a 4 over 3 over 4 type of packing, 102 holds the same number in 5 over 6, and rectangle 103 holds all 11 in a single line. If square conductors (for example) were to be employed, the details of packing would differ.

Figure 2:
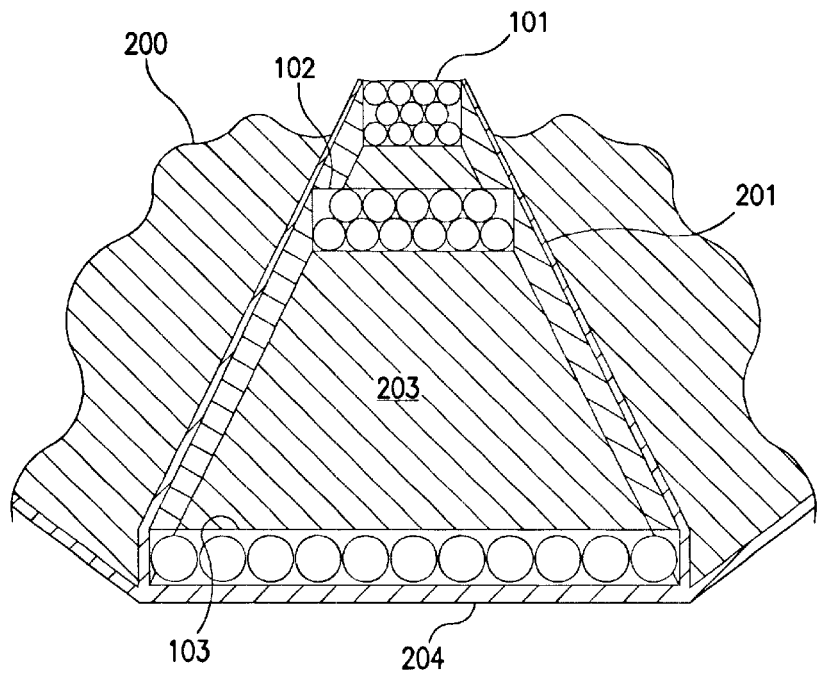

FIG. 2 shows the outlines of FIG. 1 superimposed on a perspective view of a diagrammatic stator moulding ("coil former") 200 or shaped disk according to the invention. Note that the separator or fin 201 between one winding and its neighbour is of substantially constant, minimal width, while any tangential section across the depression reveals a substantially constant cross-sectional area (See also FIG. 4). Preferably each depression is also deeper towards the center of the shaped disk, so that the cross-sectional area in a tangential plane to the axis of rotation of the second surface and including a winding area is substantially similar. Put in another way, the depression 203 within the stator moulding is shaped so as to become shallower towards the periphery 204. (This is because in most cases it is inconvenient to provide a disk having mounted permanent magnets in other than a generally flat surface, although a flattened concave conical magnet surface is of course a possibility). Each individual conductor closely follows an imaginary radius line.

Figure 3:
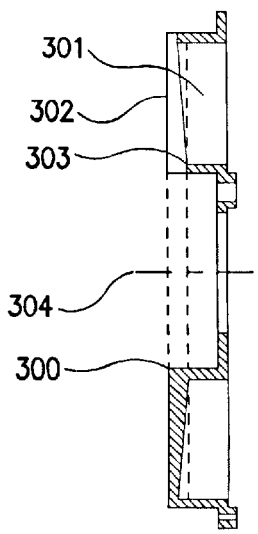
FIG. 3 is a dimensioned engineering drawing of a stator moulding, in section.
Figure 4:
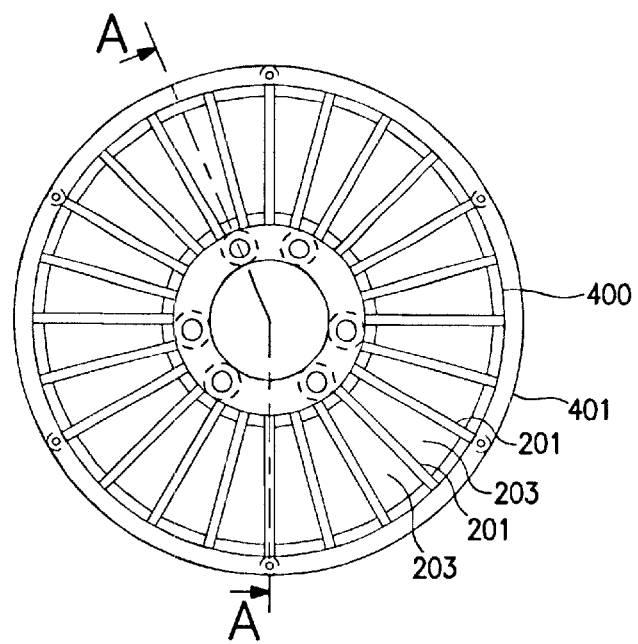
FIG. 4 is a dimensioned engineering drawing of a stator moulding, in surge view.

FIG. 3 shows a section (from line A—A in FIG. 4) through a stator moulding 300 according to the invention, with a depression 203 having a sloping floor 303 as previously described, towards the center 304. Dimensions (in mm) are included in this example for an eight-pole disk motor. The space 301 is intended to hold a ferromagnetic portion of the magnetic circuit 302 is the surface that in use will be adjacent to a disk carrying permanent magnets FIG. 4 shows a surface view of a stator moulding 400 according to the invention having the form of a disk 401, including two of 24 minimised-thickness separators 201 alternating with shaped depressions 203 as previously described. Dimensions (in mm) are included in this example for a three-phase, eight-pole disk motor.

Figure 5:
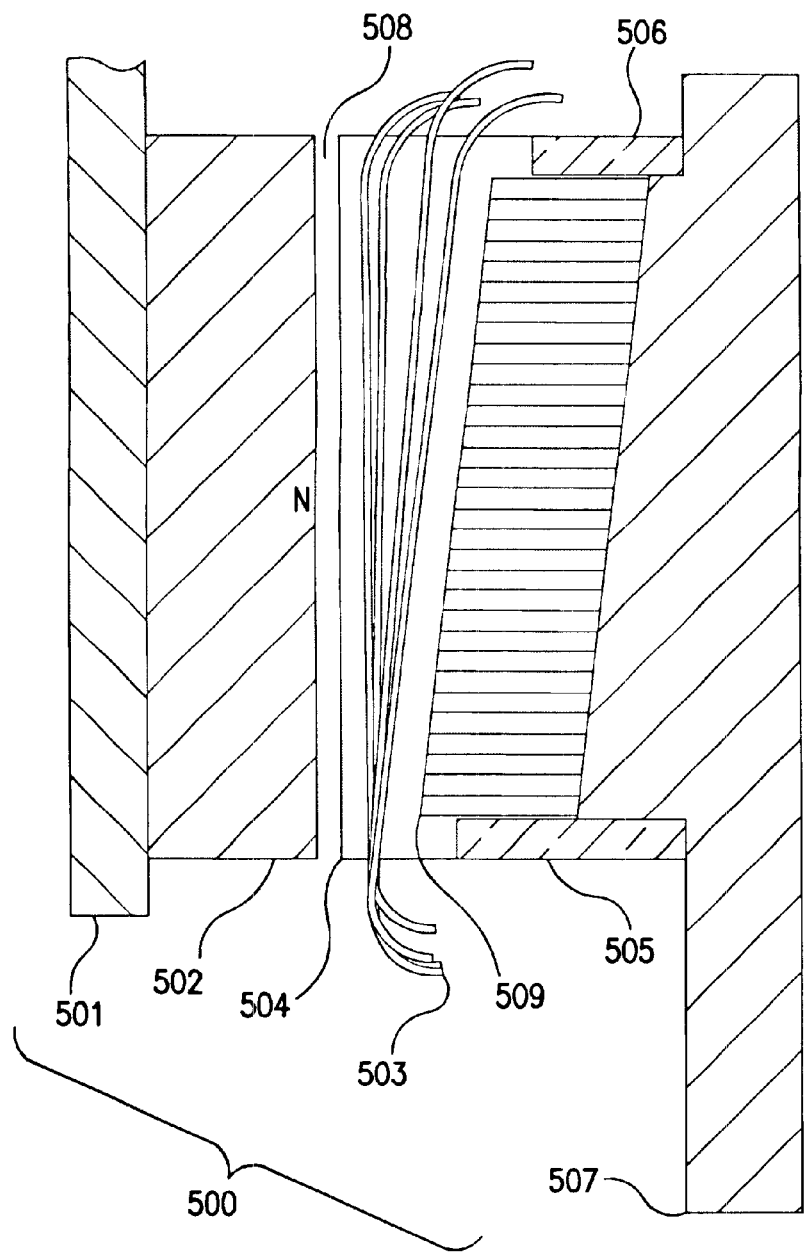
FIG. 5 shows a cross sectional view of a disk motor including a stator having a depression cut along a radius, with representations of some conductors and a watch-spring style laminated ferromagnetic backing.
Figure 6:
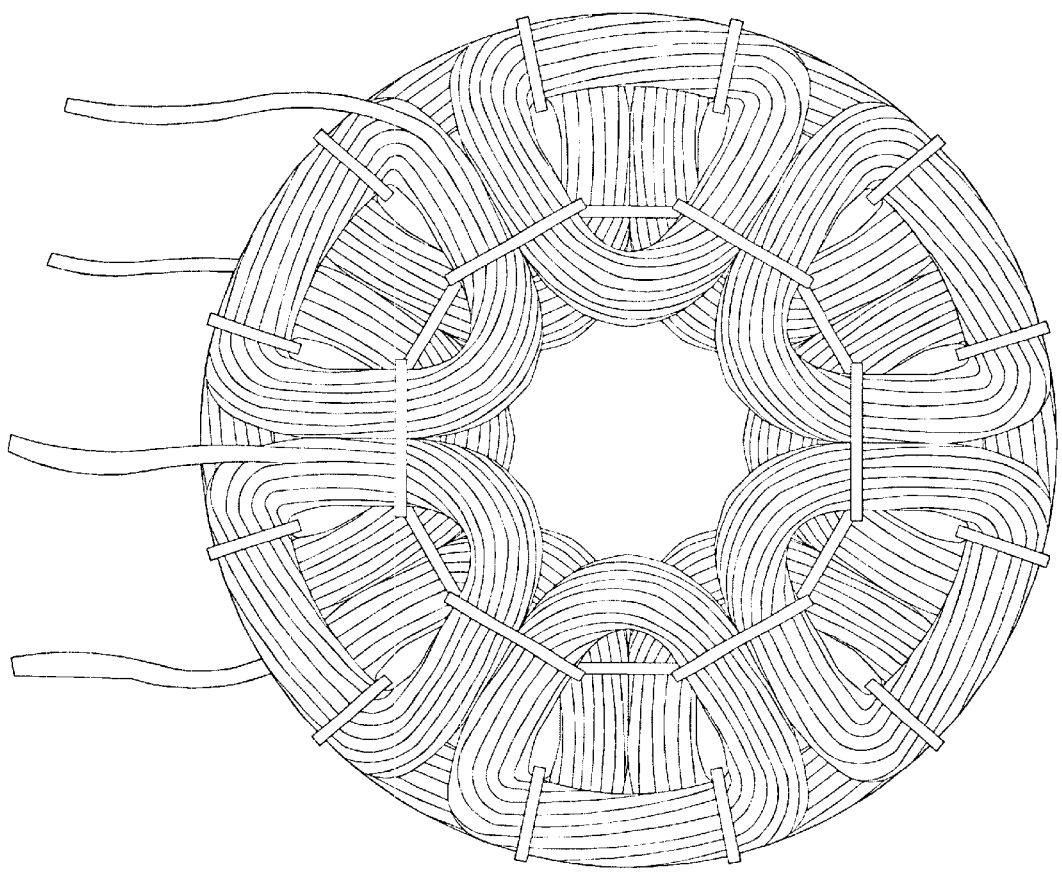
FIG. 6 shows a pre-formed stator winding prior to attachment to a stator.

FIG. 5 shows a radial section 500 through the midline of a sector of a completed stator 507 having a centrally more depressed cavity (as described previously) and a ferromagnetic mass 509 beneath the windings 503 (four conductors shown here) which, as shown in FIG. 2, diverge in the plane of the disk surface towards the periphery and concentrate, so lie more or less above each other within the more depressed area near the center which is above the top of FIG. 5.

The example ferromagnetic mass 509 is in this case a watch-spring strip of a suitable coated steel that occupies about the same annular width as do the set of magnets. It can be contained between an inner ring 506 and an outer ring 505 of any suitable material. In one prototype we used "Tufnol"; a fabric-reinforced phenolic plastics material. These rings are optional—in some versions of the motor they assist in holding the ferromagnetic mass in place.

The stator body 507 can beneficially be made from a thermally conductive material, (e.g. metallic) to remove heat from the back iron 509 and the winding 503. The body 597 can, for example, be made from aluminium. Alternatively it can be made from any other metallic material. Alteratively it can be non-metallic (e.g. constructed from an applicable engineering plastic such as Rynite).

The steel rotor is shown as 501 and it carries a magnet 502 (a North pole is shown here) which faces the windings across a small gap 508. The dividing strip (here 504; elsewhere 201) is the closest portion of the stator 507 to the rotor.

Note that the ferromagnetic material also preferably slopes away from the rotor towards the center of the stator. A watch spring core, or a wound iron core can be wound in this shape or distorted afterwards, while bulk materials may be pressed, cast, ground, turned, or otherwise shaped accordingly.

If on the other hand it is preferable to provide a concave flattened cone shape in the rotor assembly, the deepening of the stator depressions is not required.

Stator depressions can be omitted if the winding is pre-formed as shown in FIG. 6 and is attached to a the surface of a stator having the shaped ferromagnetic layer 509 (but the dividers 504 will be absent). Note that the each group of conductors follows a generally trapezoidal path, but it is the generally radial portions (relative to the center of the winding) that correspond to the illustration of FIGS. 1 and 2.

The pre-forming of the stator windings as shown in FIG. 6 (which is a photocopy of an actual winding) allows multiple windings to overlap as shown without interference from the dividers of FIG. 5. The conductors can be wound onto a shaped former, then held in the required shape by a resin or the like and subsequently attached to the shaped stator.

VARIATIONS

Variations of the preferred ferromagnetic materials include: iron wire or strip wound in the form of a coil, (possibly though less likely a ferrite), iron powder (such as "Accucore" (TM) Magnetics Intentional), or for dynamoelectric machines intended for use at relatively low speeds, bulk iron would do. Silicon steel having a low hysteresis would be preferable. When the rotor moves, the ferromagnetic material in the stator carries flux in first one direction and then the other, so magnetically soft, low hysteresis-loss materials are preferable, more particularly at higher speeds when the rate of reversal increases.

Although an eight pole motor is described here, the number of poles is between two and perhaps even more than 128.

COMMERCIAL BENEFITS OR ADVANTAGES

The modified stator having a centrally deepening depression formed by the shaped back iron in order to accommodate the windings is relatively easy to manufacture and does not impose any extra difficulty in manufacture or use of dynamoelectric machines in which it is used It improves the efficiency of such machines both by closing the gaps in the magnetic circuit and also by maximising the stator slot area available for conductors.

Finally, we wish to reiterate that although further variations on the invention as described herein may present themselves to a reader, these variations are nevertheless included within the scope of the invention as set forth.

What is claimed is:

1. A stator winding for a discoidal rotary dynamoelectric machine, comprising a generally planar winding made up of a plurality of generally trapezoidal shaped conductor coils, each conductor winding forming a sector shaped loop capable of placement on a stator disc and having a pair of generally radially disposed groups of conductors, wherein the space occupied by the conductors of any one group is:
   (a) wider (from side to side) and shallower towards the periphery of the stator, and
   (b) narrower (from side to side) and deeper towards the center of the stator.

2. A discoidal rotary dynamoelectric machine, having at least a rotor disk and a stator disk supporting a stator winding as claimed in claim 1.

3. A discoidal rotary dynamoelectric machine, as claimed in claim 2, wherein each group of conductors on the stator lies over a ferromagnetic material having a magnetic permeability greater than that of air.

4. A discoidal rotary dynamoelectric machine, as claimed in claim 3, wherein the cross-sectional area of each group of conductors is substantially constant at any plane tangential to the axis of rotation and including the radially disposed groups of conductors.

5. A discoidal rotary dynamoelectric machine as claimed in claim 4, wherein the ferromagnetic material slopes away from the rotor from the periphery of the stator towards the center of the stator, so that the ferromagnetic material is maintained adjacent to the windings.

6. A discoidal rotary dynamoelectric machine, as claimed in claim 5, wherein the ferromagnetic material is chosen from the group comprising: iron wire or iron strip wound in the form of a watch-spring coil, a ferrite, iron powder, and bulk iron.

7. A discoidal rotary dynamoelectric machine, as claimed in claim 6, wherein the stator is a shaped disk and has a plurality of generally radially disposed depressions capable of receiving a plurality of turns of the conductors, wherein each depression is wider towards the periphery of the disk.

8. A discoidal rotary dynamoelectric machine, as claimed in claim 7, wherein each depression is also deeper towards the center of the shaped disk.

9. A discoidal rotary dynamoelectric machine, as claimed in claim 2, wherein the rotor has between two and 128 permanent magnetic poles.

10. A discoidal rotary dynamoelectric machine as claimed in claim 6, wherein the watch-spring coil is deformed into a frusto-conical shape.

* * * * *

UNITED STATES PATENT AND TRADEMARK OFFICE
CERTIFICATE OF CORRECTION

PATENT NO. : 6,580,195 B1
DATED : June 17, 2003
INVENTOR(S) : Noble et al.

It is certified that error appears in the above-identified patent and that said Letters Patent is hereby corrected as shown below:

Column 1,
Line 55, change "malarial" to -- material --.

Column 2,
Line 3, change "tins" to -- turns --.
Line 49, change "are&" to -- area. --.

Column 3,
Line 61, change "surge" to -- surface --.

Column 4,
Line 31, after "disk" insert -- . --.

Column 5,
Line 26, change "alteratively" to -- alternatively --.

Column 6,
Line 12, after "used" insert -- . --.

Signed and Sealed this

Second Day of December, 2003

JAMES E. ROGAN
*Director of the United States Patent and Trademark Office*